(12) United States Patent
Spanner

(10) Patent No.: US 11,892,019 B2
(45) Date of Patent: Feb. 6, 2024

(54) PRECISION COUPLING

(71) Applicant: MAGNA STEYR Fahrzeugtechnik AG & Co KG, Graz (AT)

(72) Inventor: Gerhard Spanner, Ilz (AT)

(73) Assignee: MAGNA STEYR Fahrzeugtechnik GmbH & Co KG, Graz (AT)

( * ) Notice: Subject to any disclaimer, the term of this patent is extended or adjusted under 35 U.S.C. 154(b) by 186 days.

(21) Appl. No.: 17/492,995

(22) Filed: Oct. 4, 2021

(65) Prior Publication Data

US 2022/0106971 A1 Apr. 7, 2022

(30) Foreign Application Priority Data

Oct. 6, 2020 (DE) .......................... 102020212618.6

(51) Int. Cl.
*F16B 2/18* (2006.01)
*F16B 2/10* (2006.01)

(52) U.S. Cl.
CPC .................. *F16B 2/18* (2013.01); *F16B 2/10* (2013.01)

(58) Field of Classification Search
CPC .... F16B 2/18; F16B 2/10; F16B 2/185; F16B 5/10
USPC ...................................................... 248/230.4
See application file for complete search history.

(56) References Cited

U.S. PATENT DOCUMENTS

| | | | |
|---|---|---|---|
| 11,170,745 B1* | 11/2021 | Cabo | F16B 2/10 |
| 2013/0037668 A1 | 2/2013 | Benedetti et al. | |
| 2015/0286115 A1* | 10/2015 | Koch | F16M 11/2078 248/230.4 |
| 2021/0180625 A1* | 6/2021 | Macnaughton | F16B 2/18 |
| 2021/0222859 A1* | 7/2021 | Zhang | F21V 21/088 |
| 2022/0106971 A1* | 4/2022 | Spanner | F16B 2/18 |

FOREIGN PATENT DOCUMENTS

| | | |
|---|---|---|
| DE | 2256937 A | 6/1974 |
| DE | 69106449 T2 | 8/1995 |
| DE | 102017202767 A1 | 8/2017 |
| GB | 1407360 A | 9/1975 |

* cited by examiner

*Primary Examiner* — Muhammad Ijaz
(74) *Attorney, Agent, or Firm* — Jordan IP Law, LLC; Todd A. Vaughn

(57) ABSTRACT

A precision coupling for securing a component to an apparatus. The precision coupling includes a first coupling half for connection to the apparatus and a second coupling half for connection to the component. The first coupling half has a clamping lever configured for pivoting about a pivot axle, the clamping lever having at least one lateral flap with a first inclined tightening face. The second coupling half has at least one locking finger with a second inclined tightening face so that when the clamping lever is pivoted and the first coupling half and the second coupling half are placed against each other in an open position, the at least one lateral flap engages behind the at least one locking finger and the first inclined tightening face slides along the second inclined tightening face and to thereby pull the first coupling half and the second coupling half against each other in order to assume a locking position.

19 Claims, 6 Drawing Sheets

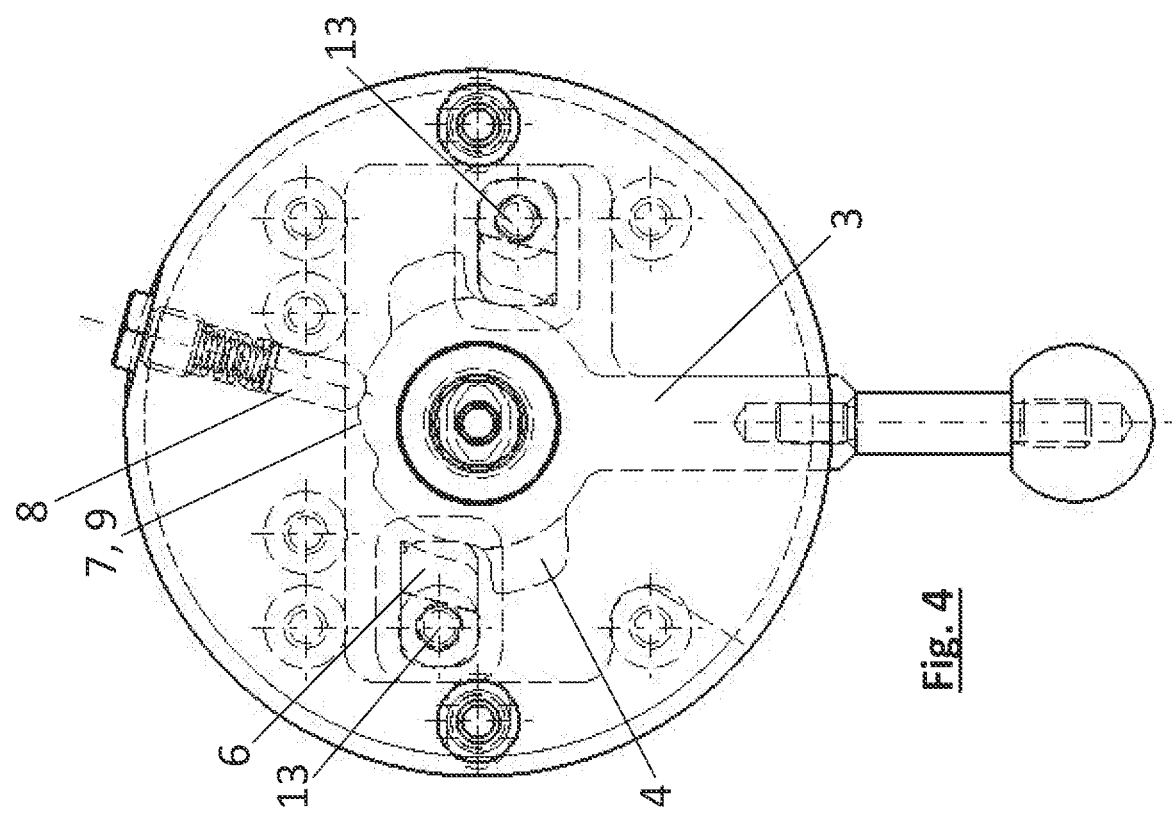

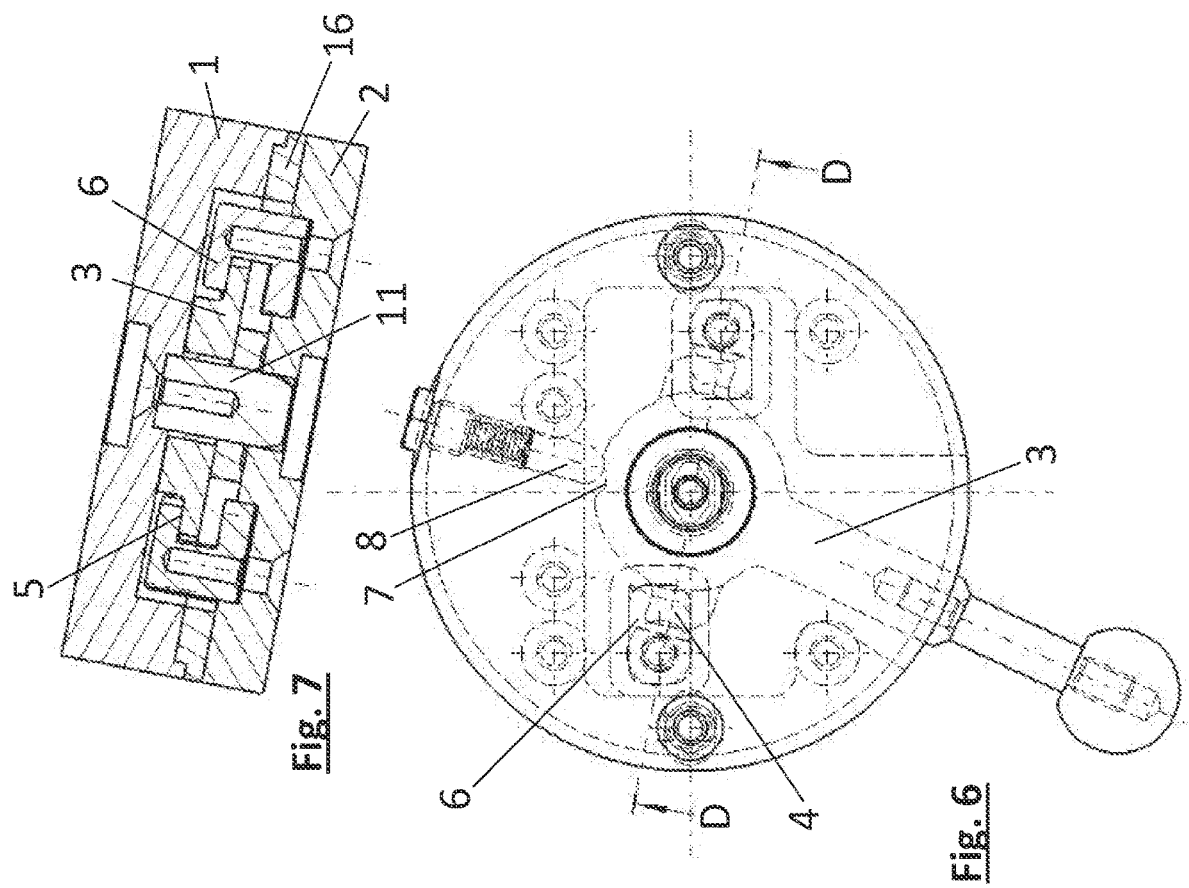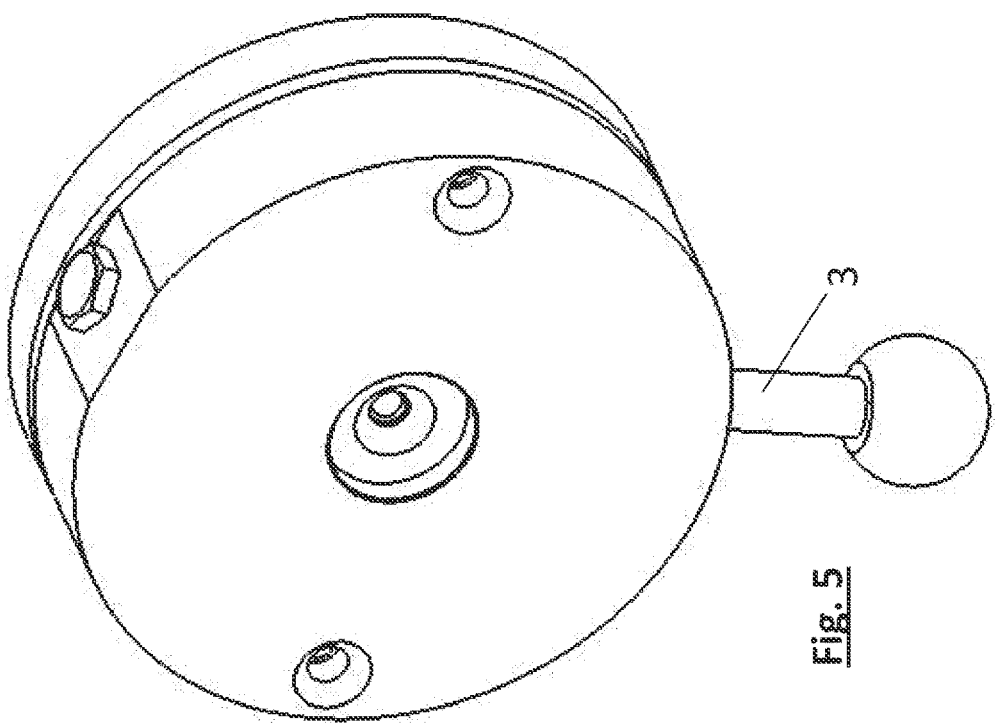

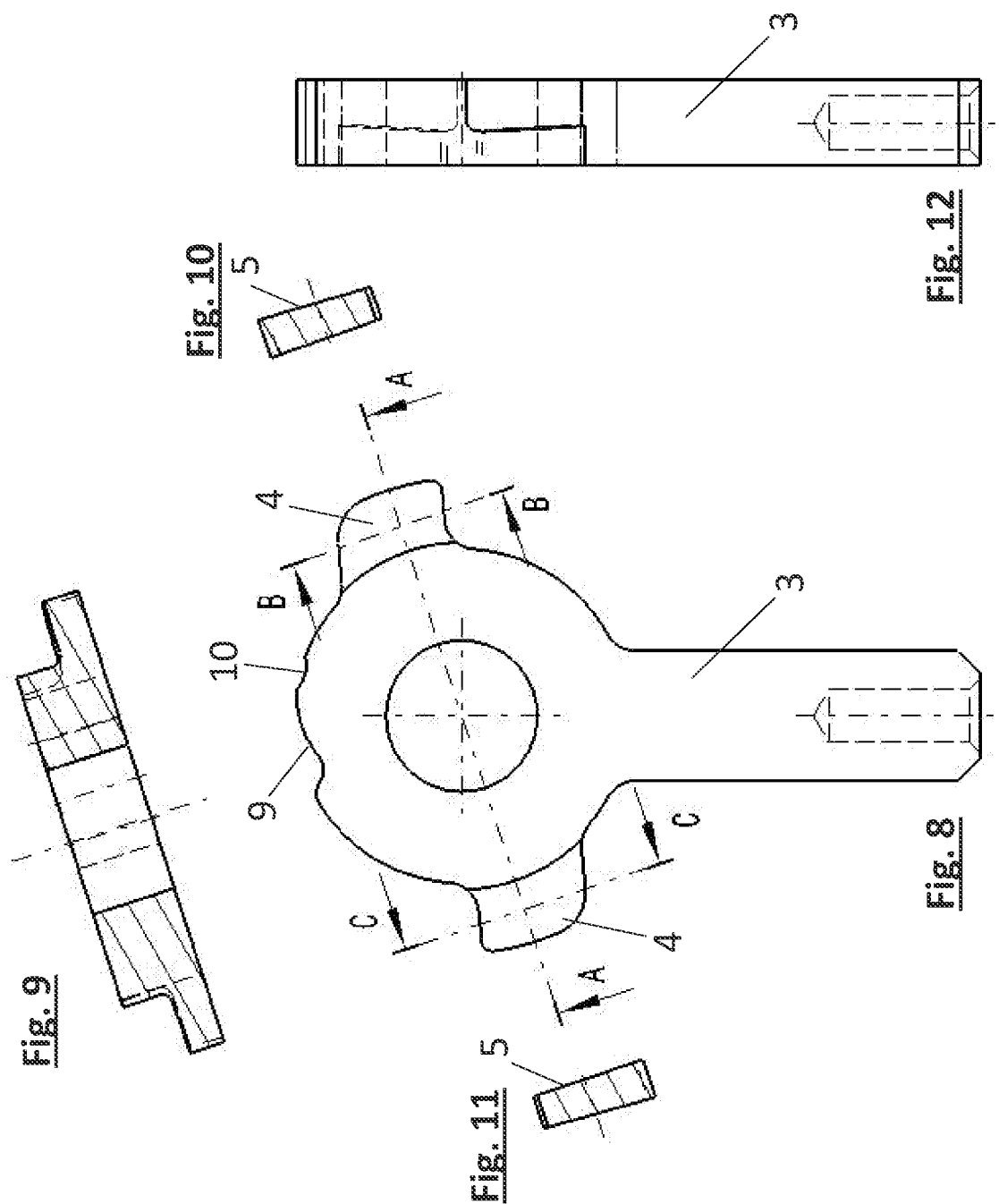

PRECISION COUPLING

CROSS-REFERENCE TO RELATED APPLICATIONS

The present application claims priority under 35 U.S.C. § 119 to German Patent Publication No. DE 102020212618.6 (filed on Oct. 6, 2020), which is hereby incorporated by reference in its complete entirety.

TECHNICAL FIELD

Embodiments relate to a precision coupling for securing a component to an apparatus.

BACKGROUND

It is known to provide couplings which comprise a first coupling half and a second coupling half in order to secure components to stable apparatuses in the most precise manner possible. Such couplings may, for example, be used in automotive construction. The apparatus may, for example, be a measuring apparatus and the component may be a component of a motor vehicle which is intended to be checked. The apparatus may, for example, also be a tool and the component may be a manipulator which is intended to be placed on the tool in order to be inserted by the tool.

The first coupling half or the second coupling half can be connected to the apparatus securely or so as to be able to be replaced. The other of the two coupling halves may be connected to the component, for example, the manipulator, securely or so as to be able to be replaced. By locking the two coupling halves to each other, therefore, the component can be secured to the apparatus.

It is already known that such couplings may be able to be closed and opened manually.

For example, German Patent Publication No. DE 10 2017 202 767 A1 discloses an apparatus for connecting pneumatic tools to manipulators, wherein the apparatus has the following features: a) a main body which can be secured to a manipulator and which is provided with one or more seats for receiving corresponding coupling portions of a tool; b) at least one passage for supplying a working fluid to the tool or for drawing a working fluid from the tool, wherein the passage extends through the main body of the apparatus; c) an engagement mechanism in order to engage the coupling portions of the tool, wherein the engagement mechanism can be moved with respect to the main body between a locking position, in which the coupling portions of the tool are locked in the corresponding seats of the main body, and an unlocking position, in which the coupling portions of the tool are free to uncouple the corresponding seats of the main body; wherein the engagement mechanism in the locking position pneumatically holds the passage open in order to enable the flow of the working fluid, and the engagement mechanism in the unlocking position pneumatically holds the passage closed in order to prevent the flow of the working fluid.

The coupling of this solution, however, has the disadvantage that component tolerances which are present during closing cannot be well compensated for and consequently with a closed coupling play remains between the component which is secured and the manipulator.

SUMMARY

Embodiments relate to a precision coupling for securing a component to an apparatus, wherein a play-free retention of the component on the apparatus can be achieved via simple manual activation of the coupling.

In accordance with one or more embodiments, a precision coupling for securing a component to an apparatus, comprising a first coupling half and a second coupling half. The first coupling half comprises a clamping lever which can be pivoted about a pivot axle, the clamping lever having at least one lateral flap with an inclined tightening face. The second coupling half has at least one locking finger with an inclined tightening face so that, when the coupling halves are placed against each other in an open position, when the clamping lever is pivoted, the lateral flap of the first coupling half engages behind the locking finger of the second coupling half and the inclined tightening face of the lateral flap slides along the inclined tightening face of the locking finger and the two coupling halves are thereby pulled against each other in order to assume a locking position.

As set forth, described, and/or illustrated herein, the term "laterally" is intended to be understood to refer to a plane which is located normally relative to the pivot axle and which is consequently substantially in the plane of movement of the clamping lever. The "lateral flap" is consequently a planar formation which protrudes from the clamping lever in the plane of movement of the clamping lever, preferably protrudes substantially radially from the pivot axle.

The flap may engage behind a locking finger of the second coupling half. The locking finger therefore has a surface which is raised from the second coupling half.

Both the flap and the locking finger have inclined tightening faces, that is to say, faces which are inclined with respect to a base plane of the respective coupling half. Since the flap engages behind the locking finger, at least the face of the flap facing the first coupling half and the face of the locking finger facing the second coupling half are constructed as a tightening face and consequently in an inclined manner.

In accordance with one or more embodiments, in order to close the coupling halves, the clamping lever is pivoted so that the lateral flap of the first coupling half engages behind the locking finger of the second coupling half and the inclined tightening face of the lateral flap slides along the inclined tightening face of the locking finger and the two coupling halves are thereby drawn against each other in order to assume a locking position. As a result of the inclined tightening faces, therefore, the two coupling halves and consequently the component and the apparatus are pulled against each other. The securing of the component can therefore be carried out in a play-free manner.

In accordance with one or more embodiments, the clamping lever has at least two lateral flaps each having an inclined tightening face and the second coupling half has at least two locking fingers each having an inclined tightening face so that, when coupling halves are placed against each other in the open position, when the clamping lever is pivoted, the lateral flaps of the first coupling half engage behind the locking fingers of the second coupling half and the inclined tightening faces of the lateral flaps slide along the inclined tightening faces of the locking fingers and the two coupling halves are thereby pulled against each other in order to assume the locking position.

In accordance with one or more embodiments, the two or two respective lateral flaps are opposite each other with the pivot axle as the centre point. The flaps therefore preferably protrude at opposing sides from the central pivot axle of the clamping lever.

In accordance with one or more embodiments, the clamping lever has a lateral contour, meaning, a contour which again protrudes laterally from the clamping lever, i.e., in the movement direction of the clamping lever, such as, for example, in the same plane of the flap or flaps, but in peripheral regions in which no flaps are formed. A resiliently loaded fixing pin slides along the lateral contour when the clamping lever is activated. The lateral contour of the clamping lever has a curve which radially declines in the direction towards the locking position. The manual activation of the clamping lever into the locking position is thereby facilitated by the resilient force.

In accordance with one or more embodiments, the lateral contour of the clamping lever also has a notch and the resiliently loaded fixing pin engages in the notch in the open position. The clamping lever is thereby readily fixed in the open position thereof.

In accordance with one or more embodiments, a central positioning stud is constructed on the pivot axle of the first coupling half, wherein the clamping lever can be pivoted about the central positioning stud. A bush may be arranged for this purpose on the positioning stud. The second coupling half preferably has a central opening, in particular a hole, so that the two coupling halves can be positioned with respect to each other by introducing the central positioning stud into the central opening.

In accordance with one or more embodiments, the first coupling half and the second coupling half are constructed in a substantially circular manner. The central positioning stud and the central opening are then preferably located at the centre of the circular shape.

In accordance with one or more embodiments, the first and second coupling halves are secured against rotation relative to each other via at least one non-central positioning stud and an opposing non-central opening. The opening may be constructed as an elongate hole which extends normally relative to the undesirable rotation direction or as a round hole.

The first coupling half preferably has a receiving space for the clamping lever and limitations of the receiving space which limit the possible path for a pivot movement of the clamping lever. The receiving space is preferably axially terminated by a closure plate.

The inclination of the tightening face of the flap and the inclination of the tightening face of the locking finger are preferably approximately 3 degrees.

The first coupling half preferably has one or more fastening members for securing to the apparatus, for example, screw holes, and the second coupling half preferably has one or more fastening members for securing to the component, for example, also screw holes.

Developments of the embodiments are set out in the dependent claims, the description and the appended drawings.

DRAWINGS

Embodiments will be illustrated by way of example in the drawings and explained in the description hereinbelow:

FIG. 4 illustrates a transparent front view of a precision coupling of FIG. 2 in an open position.

FIG. 5 illustrates a three-dimensional illustration of a precision coupling of FIG. 1 in a locking position.

FIG. 6 illustrates a transparent front view of a precision coupling of FIG. 5 in a locking position.

FIG. 7 illustrates a sectioned illustration of a precision coupling taken along section D-D of FIG. 6.

FIG. 8 illustrates a front view of a clamping lever of a precision coupling of FIG. 1.

FIG. 9 illustrates a sectioned illustration of a clamping lever taken along section A-A of FIG. 8.

FIG. 10 illustrates a sectioned illustration of a clamping lever taken along section B-B of FIG. 8.

FIG. 11 illustrates a sectioned illustration of a clamping lever taken along section C-C of FIG. 8.

FIG. 12 illustrates a side view of a clamping lever of a precision coupling of FIG. 8.

DESCRIPTION

Figure 1:
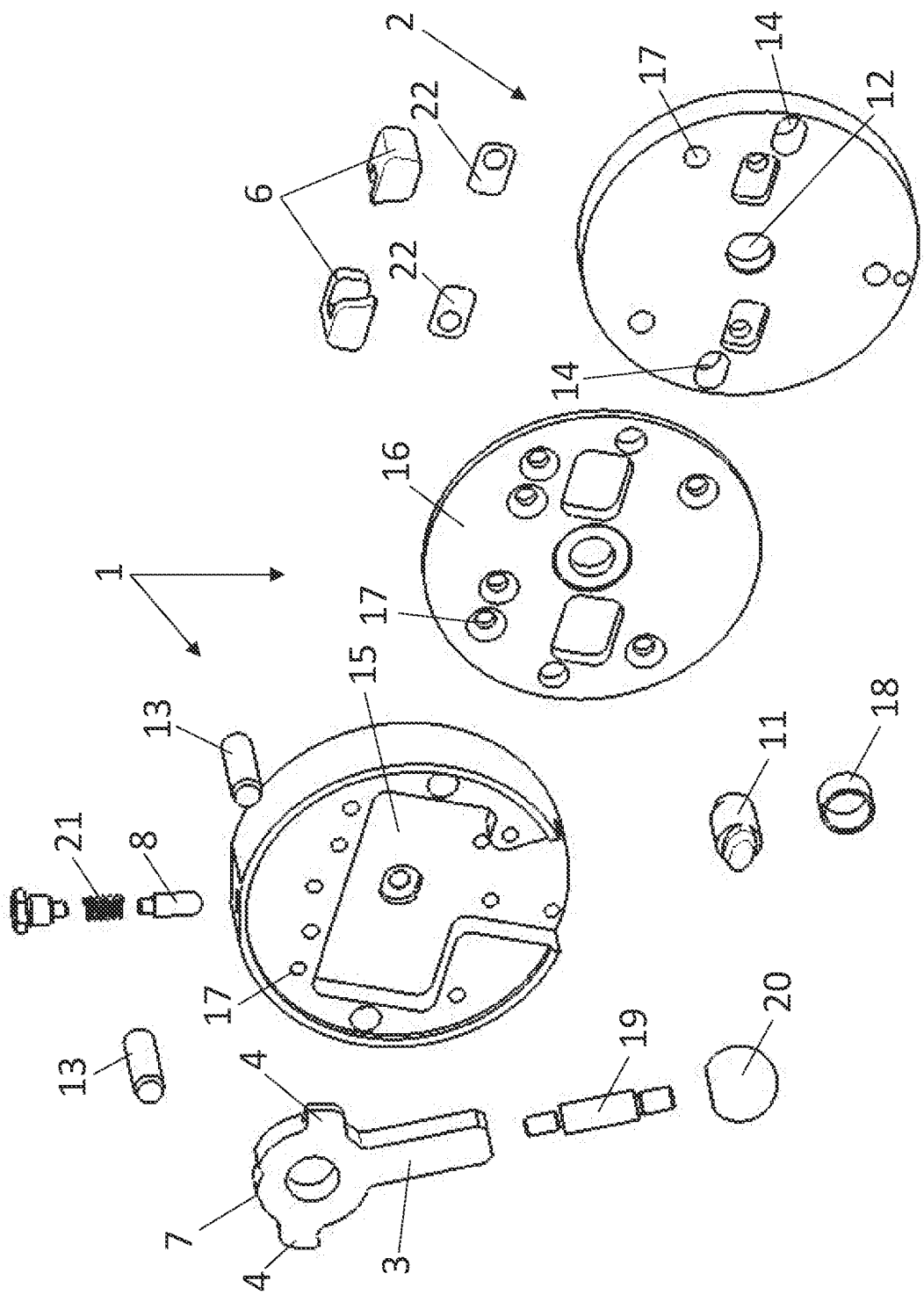
FIG. 1 illustrates an exploded illustration of a precision coupling in accordance with one or more embodiments.

In FIG. 1, the individual components of a precision coupling in accordance with one or more embodiments are illustrated as an exploded view. The precision coupling for securing a component to an apparatus comprises a first coupling half 1 and a second coupling half 2. The first coupling half 1 comprises a substantially flat, cylindrical base member which has a receiving space 15 for a clamping lever 3. In addition, the first coupling half 1 has a round closure plate 16 which is configured to axially close the base member of the first coupling half 1 and consequently the receiving space 15. The clamping lever 3 can be pivoted about a pivot axle. The pivot axle is constructed via a central positioning stud 11 and a bush 18 which can be rotated on the central positioning stud 11. A hole of the clamping lever 3 is secured to the bush 18 in a rotationally secure manner.

Figure 2:
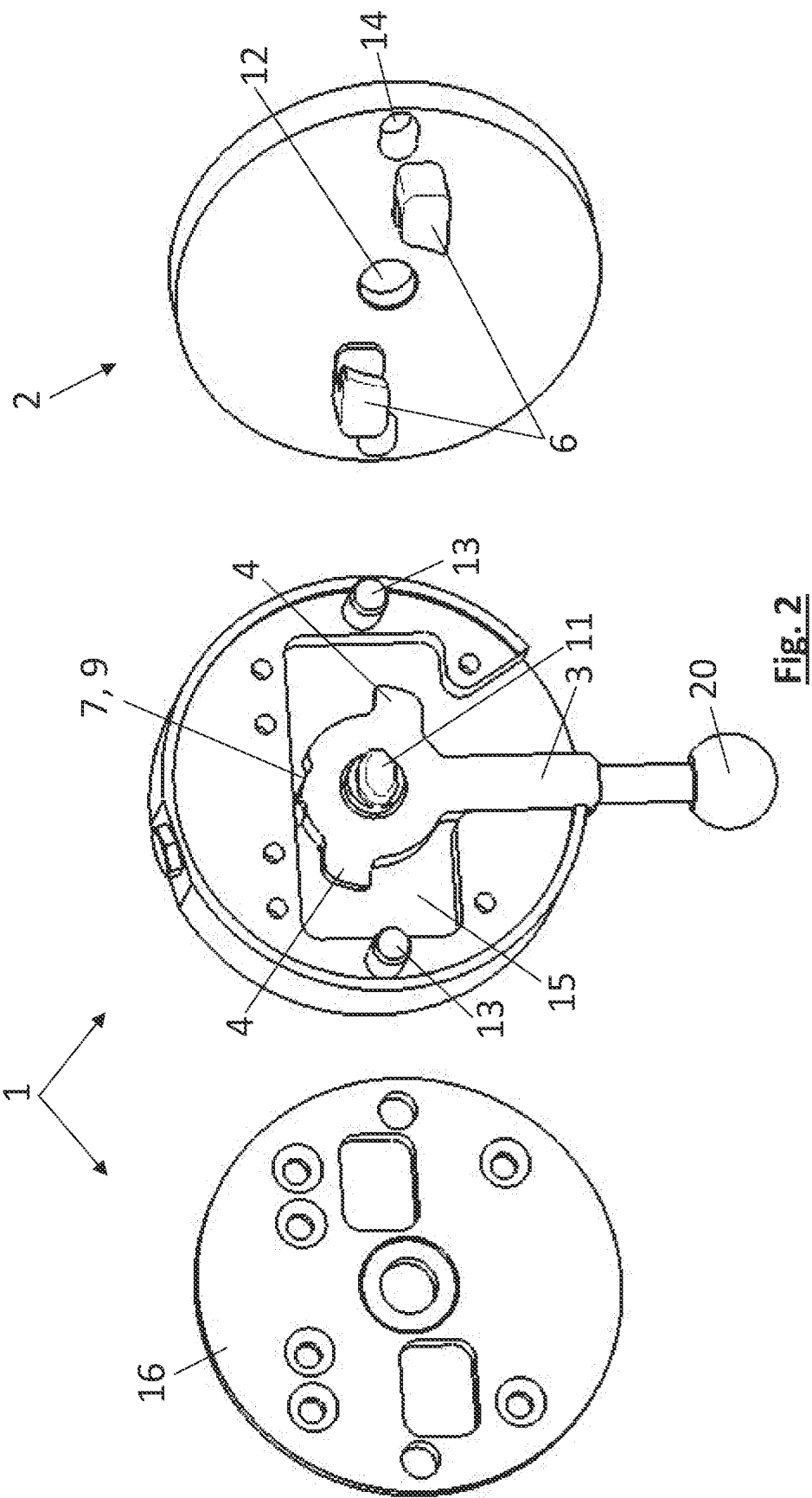
FIG. 2 illustrates a three-dimensional illustration of the precision coupling of FIG. 1 in an open position, with the closure plate removed.

As illustrated in detail in FIGS. 8 to 12, the clamping lever 3 has two lateral flaps 4, each with an inclined tightening face 5. The second coupling half 2 has two locking fingers 6 which are in each case associated with the lateral flaps 4 and which each have an inclined tightening face 5. When the coupling halves 1, 2 are placed against each other in the open position (FIGS. 2 to 4), when the clamping lever 3 is pivoted the lateral flaps 4 of the first coupling half 1 engage behind the locking fingers 6 of the second coupling half 2 and the inclined tightening faces 5 of the lateral flaps 4 slide along the inclined tightening faces 5 of the locking fingers 6 so that the two coupling halves 1, 2 are pulled against each other in order to assume the locking position (FIGS. 5 and 6). In order to achieve a uniform clamping force of the two locking fingers 6, the two locking fingers 6 can be adjusted in terms of height via thin bearing plates 22.

The two lateral flaps 4 are, with the pivot axle as the centre, constructed opposite each other on the clamping lever 3, preferably in one (unitary) piece. The clamping lever 3 additionally has a lever element 19 as an extension of the lever and a ball handle 20 for operating the lever.

The clamping lever 3 has a side contour 7 which has a curve 9 which declines radially in the direction towards the locking position (FIG. 8), and a notch 10 at the beginning of the radially declining curve 9. A fixing pin 8 which is pretensioned by a spring 21 engages in the open position of the clamping lever 3 in the notch 10 (see FIG. 4). When the clamping lever 3 is activated in the direction towards the locking position, the fixing pin 8 slides along the radially declining curve 9 of the side contour 7 (FIG. 6).

On the pivot axle of the first coupling half 1, a central positioning stud 11 is constructed, wherein the clamping lever 3 can be pivoted about the central positioning stud 11. The second coupling half 2 has in a state associated with this positioning stud 11 a central opening 12, i.e., a hole, so that the two coupling halves 1, 2 can be positioned with respect to each other by introducing the central positioning stud 11 into the central opening 12.

Figure 3:
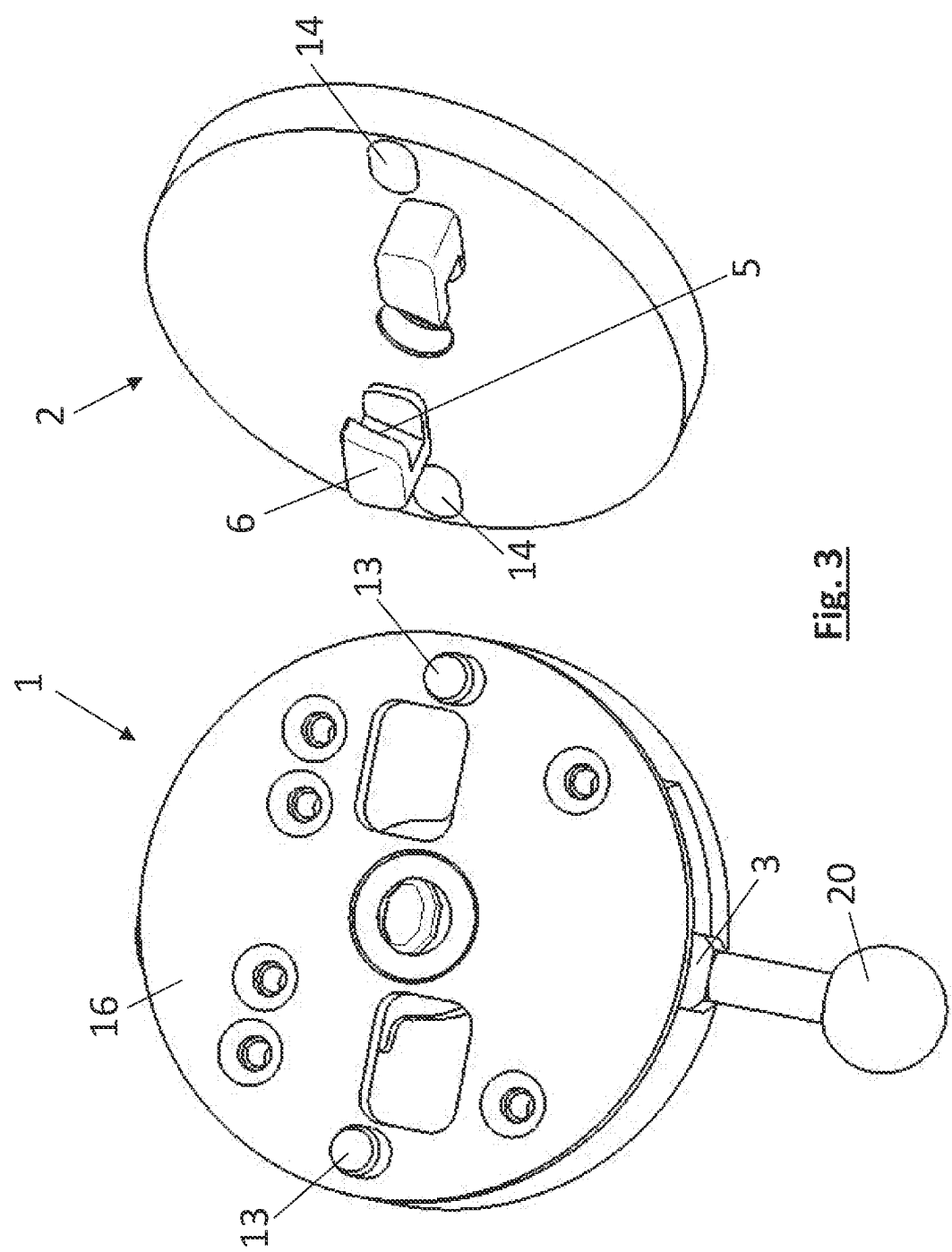
FIG. 3 illustrates a three-dimensional illustration of a precision coupling of FIG. 2 in an open position, with a closure plate positioned.

In addition, the first and second coupling halves 1, 2 are secured against rotation with respect to each other via two non-central positioning studs 12 and an opposing non-central opening 14. The non-central openings 14 are constructed as radially expanded elongate holes. The inclination of the tightening faces 5, the flaps 4 and the locking fingers 6 as illustrated in FIGS. 3, 10, and 11 is approximately 3 degrees with respect to the base faces of the first and second coupling halves 1, 2, respectively. The first coupling half 1 and the second coupling half 2 further have a plurality of screw holes 17 for securing to a desired component, for example, manipulator, or an apparatus.

The base member of the first coupling half 1 may, for example, be produced from aluminium. The base member of the second coupling half 2 and/or the closure plate 16 and/or the clamping lever 3 and/or the locking fingers 6 may, for example, be produced from hardened steel.

The terms "coupled," "attached," or "connected" may be used herein to refer to any type of relationship, direct or indirect, between the components in question, and may apply to electrical, mechanical, fluid, optical, electromagnetic, electromechanical or other connections. In addition, the terms "first," "second," etc. are used herein only to facilitate discussion, and carry no particular temporal or chronological significance unless otherwise indicated.

Those skilled in the art will appreciate from the foregoing description that the broad techniques of the embodiments can be implemented in a variety of forms. Therefore, while the embodiments have been described in connection with particular examples thereof, the true scope of the embodiments should not be so limited since other modifications will become apparent to the skilled practitioner upon a study of the drawings, specification, and following claims.

LIST OF REFERENCE SYMBOLS

1 First coupling half
2 Second coupling half
3 Clamping lever
4 Lateral flap
5 Tightening face
6 Locking finger
7 Side contour
8 Fixing pin
9 Radially declining curve
10 Notch
11 Central positioning stud
12 Central opening
13 Non-central positioning stud
14 Non-central opening
15 Receiving space
16 Closure plate
17 Screw hole
18 Bush
19 Lever element
20 Ball handle
21 Spring
22 Bearing plate

What is claimed is:

1. A precision coupling for securing a component to an apparatus, the precision coupling comprising:
    a first coupling half having a pivot axle and a clamping lever configured for pivoting about the pivot axle, the clamping lever having at least one lateral flap with a first inclined tightening face, a lateral contour and a resiliently loaded fixing pin configured to slide along the lateral contour when the clamping lever is activated; and
    a second coupling half having at least one locking finger with a second inclined tightening face so that when the clamping lever is pivoted and the first coupling half and the second coupling half are placed against each other in an open position, the at least one lateral flap engages behind the at least one locking finger and the first inclined tightening face slides along the second inclined tightening face and to thereby pull the first coupling half and the second coupling half against each other in order to assume a locking position,
    wherein the lateral contour has a curve which radially declines in a direction towards the locking position.

2. The precision coupling of claim 1, wherein the lateral contour comprises a notch and the resiliently loaded fixing pin engages in the notch in the open position.

3. The precision coupling of claim 1, further comprising a central positioning stud on the pivot axle of the first coupling half to facilitate pivoting of the clamping lever.

4. The precision coupling of claim 3, wherein the second coupling half comprises a central opening to facilitate positioning of the first coupling half and the second coupling half with respect to each other by introducing the central positioning stud into the central opening.

5. The precision coupling of claim 1, further comprising at least one non-central positioning stud and an opposing non-central opening to facilitate securing of the first coupling half and second coupling half against rotation relative to each other.

6. The precision coupling of claim 1, wherein:
    the first coupling half comprises a receiving space for the clamping lever, and
    limitations of the receiving space limit a possible path for pivot movement of the clamping lever,
    the receiving space is axially terminated by a closure plate.

7. The precision coupling of claim 1, wherein an inclination of the first inclined tightening face and an inclination of the second inclined tightening face are approximately 3 degrees.

8. The precision coupling of claim 1, wherein:
    the first coupling half comprises one or more first fastening members for securing the first coupling half to the apparatus, and
    the second coupling half comprises one or more second fastening members for securing the second coupling half to the component.

9. A precision coupling for securing a component to an apparatus, the precision coupling comprising:
    a first coupling half having a clamping lever configured for pivoting about a pivot axle, the clamping lever having at least two lateral flaps arranged are opposite each other with the pivot axle as a centre point, each lateral flap in the at least two lateral flaps having a first inclined tightening face; and
    a second coupling half having at least two locking fingers, each locking finger in the at least two locking fingers having a second inclined tightening face so that when the clamping lever is pivoted and the first coupling half and the second coupling half are placed against each other in an open position, the at least two lateral flaps engage behind the at least two locking fingers and the first inclined tightening face slides along the second inclined tightening face and to thereby pull the first coupling half and the second coupling half against each other in order to assume a locking position.

10. The precision coupling of claim 9, wherein:
the clamping lever comprises a lateral contour and a resiliently loaded fixing pin configured to slide along the lateral contour when the clamping lever is activated, and
the lateral contour has a curve which radially declines in a direction towards the locking position.

11. The precision coupling of claim 10, wherein the lateral contour comprises a notch and the resiliently loaded fixing pin engages in the notch in the open position.

12. The precision coupling of claim 9, further comprising a central positioning stud on the pivot axle of the first coupling half to facilitate pivoting of the clamping lever thereabout can be pivoted about the central positioning stud.

13. The precision coupling of claim 12, wherein the second coupling half comprises a central opening to facilitate positioning of the first coupling half and the second coupling half with respect to each other by introducing the central positioning stud into the central opening.

14. The precision coupling of claim 9, further comprising at least one non-central positioning stud and an opposing non-central opening to facilitate securing of the first coupling half and second coupling half against rotation relative to each other.

15. The precision coupling of claim 9, wherein:
the first coupling half comprises a receiving space for the clamping lever, and
limitations of the receiving space limit a possible path for pivot movement of the clamping lever,
the receiving space is axially terminated by a closure plate.

16. The precision coupling of claim 9, wherein an inclination of the first inclined tightening face and an inclination of the second inclined tightening face are approximately 3 degrees.

17. The precision coupling of claim 9, wherein:
the first coupling half comprises one or more first fastening members for securing the first coupling half to the apparatus, and
the second coupling half comprises one or more second fastening members for securing the second coupling half to the component.

18. A precision coupling for securing a component to an apparatus, the precision coupling comprising:
a first coupling half having a pivot axle and a clamping lever configured for pivoting about the pivot axle, the clamping lever having at least one lateral flap;
a central positioning stud on the pivot axle to facilitate the pivoting of the clamping lever about the pivot axle; and
a second coupling half having at least one locking finger so that when the clamping lever is pivoted and the first coupling half and the second coupling half are placed against each other in an open position, the at least one lateral flap engages behind the at least one locking finger and slides along the at least one locking finger to thereby pull the first coupling half and the second coupling half against each other in order to assume a locking position, the second coupling half further having a central opening to facilitate positioning of the first coupling half and the second coupling half with respect to each other by introducing the central positioning stud into the central opening.

19. The precision coupling of claim 18, wherein:
the first coupling half comprises one or more first fastening members for securing the first coupling half to the apparatus, and
the second coupling half comprises one or more second fastening members for securing the second coupling half to the component.

* * * * *